United States Patent
Kuvettu et al.

(10) Patent No.: US 11,241,674 B2
(45) Date of Patent: Feb. 8, 2022

(54) NANO-CRYSTALLITE BINDER BASED CO COMBUSTION PROMOTER

(71) Applicant: Indian Oil Corporation Limited, Mumbai (IN)

(72) Inventors: Mohan Prabhu Kuvettu, Haryana (IN); Kumaresan Loganathan, Haryana (IN); Biswanath Sarkar, Haryana (IN); Balaiah Swamy, Haryana (IN); Arumugam Velayutham Karthikeyani, Haryana (IN); Alex Cheru Pulikottil, Haryana (IN); Vibhav Pandey, Haryana (IN); Sanjiv Kumar Mazumdar, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 441 days.

(21) Appl. No.: 16/356,856

(22) Filed: Mar. 18, 2019

(65) Prior Publication Data
US 2019/0291082 A1     Sep. 26, 2019

(30) Foreign Application Priority Data
Mar. 20, 2018   (IN) .............................. 201821010155

(51) Int. Cl.
| | |
|---|---|
| *B01J 23/42* | (2006.01) |
| *B01J 23/44* | (2006.01) |
| *B01J 21/04* | (2006.01) |
| *B01J 35/02* | (2006.01) |
| *B01J 35/08* | (2006.01) |
| *B01J 35/10* | (2006.01) |
| *B01J 37/00* | (2006.01) |
| *B01J 37/02* | (2006.01) |
| *B01J 37/08* | (2006.01) |
| *C10G 11/04* | (2006.01) |
| *C10G 11/18* | (2006.01) |
| *B01J 35/00* | (2006.01) |
| *C10G 11/02* | (2006.01) |

(52) U.S. Cl.
CPC .............. *B01J 23/42* (2013.01); *B01J 21/04* (2013.01); *B01J 23/44* (2013.01); *B01J 35/002* (2013.01); *B01J 35/0026* (2013.01); *B01J 35/023* (2013.01); *B01J 35/08* (2013.01); *B01J 35/1014* (2013.01); *B01J 35/1019* (2013.01); *B01J 35/1061* (2013.01); *B01J 35/1066* (2013.01); *B01J 37/0018* (2013.01); *B01J 37/0045* (2013.01); *B01J 37/0072* (2013.01); *B01J 37/0207* (2013.01); *B01J 37/0236* (2013.01); *B01J 37/08* (2013.01); *C10G 11/02* (2013.01); *C10G 11/04* (2013.01); *C10G 11/18* (2013.01); *C10G 11/182* (2013.01); *C10G 2300/405* (2013.01); *C10G 2300/70* (2013.01)

(58) Field of Classification Search
CPC ... B01J 23/42; B01J 21/04; B01J 23/44; B01J 35/002; B01J 35/0026; B01J 35/023; B01J 35/08; B01J 35/1014; B01J 35/1019; B01J 35/1061; B01J 35/1066; B01J 37/0018; B01J 37/0045; B01J 37/0072; B01J 37/0207; B01J 37/0236; B01J 37/08; C10G 11/02; C10G 11/04; C10G 11/18; C10G 11/182; C10G 2300/405; C10G 2300/70
USPC ........................................................ 502/339
See application file for complete search history.

(56) References Cited

U.S. PATENT DOCUMENTS

| | | | |
|---|---|---|---|
| 2,382,382 | A | 8/1945 | Carlsmith et al. |
| 2,647,860 | A | 8/1953 | Plank et al. |
| 3,696,025 | A | 10/1972 | Chessmore et al. |
| 3,864,461 | A | 2/1975 | Miller et al. |
| 4,093,535 | A | 6/1978 | Schwartz |
| 4,199,435 | A | 4/1980 | Chessmore et al. |
| 4,290,878 | A | 9/1981 | Blanton, Jr. |
| 4,300,997 | A | 11/1981 | Meguerian et al. |
| 4,332,782 | A | 6/1982 | Scherzer et al. |
| 4,443,553 | A | 4/1984 | Chiang et al. |
| 4,476,239 | A | 10/1984 | Chiang et al. |
| 4,542,118 | A | 9/1985 | Nozemack et al. |
| 5,565,399 | A | 10/1996 | Fraenkel et al. |

FOREIGN PATENT DOCUMENTS

| | | | |
|---|---|---|---|
| CA | 967136 | | 5/1975 |
| CN | 106378203 | A * | 2/2017 |
| EP | 0742044 | A1 | 11/1996 |

OTHER PUBLICATIONS

Machine translation of CN106378203A (Year: 2017).*

* cited by examiner

*Primary Examiner* — Haytham Soliman
(74) *Attorney, Agent, or Firm* — Blank Rome LLP

(57) ABSTRACT

The present invention relates to catalyst product, a method of making a catalyst and its use in fluid catalytic conversion process. In particular, this invention relates to a process for the preparation of CO-combustion promoter microspheres, comprising a large crystallite low surface area alumina; a composite binder comprising nano-crystallite alumina and dispersant; and platinum or palladium or both. The large crystallite low surface area alumina is bound together by the composite binder in the said particulate composition.

12 Claims, No Drawings

NANO-CRYSTALLITE BINDER BASED CO COMBUSTION PROMOTER

RELATED APPLICATIONS

This application claims the benefit of Indian Patent Application No. 201821010155, filed on Mar. 20, 2018. The content of that application is hereby incorporated by reference.

FIELD OF THE INVENTION

The present invention relates to CO-combustion promoter microspheres catalyst product. More specifically, the present invention relates to a method of making the aforesaid catalyst product and its use in fluid catalytic conversion process.

BACKGROUND OF THE INVENTION

In fluid catalytic cracking (FCC), a stream of hydrocarbon feed is contacted with fluidized catalyst particles in a reactor at a temperature of around 490 to 570° C. During the cracking process, the hydrocarbon feed is converted into valuable petroleum products along with the deposition of significant amount of coke on the catalyst used. The deposition of coke makes the catalyst unfit for further reaction. However, a major amount of activity of the spent catalyst can be regained by burning off most of the coke deposited. To achieve the same, the resulting products are first separated from the cracking zone and then volatile hydrocarbons are stripped off and the remaining products are passed to a catalyst regenerator zone. In the catalyst regenerator, the coked catalyst is contacted with oxygen rich air, so that deposited coke burns into carbon monoxide and carbon dioxide gases. Generally, regeneration is carried out at high temperatures of about 600 to 810° C. Higher the temperature more is the removal of coke. After regeneration, the catalyst is returned to the cracking zone for further catalyzing the cracking of heavy hydrocarbons.

A major disadvantage associated while regenerating FCC catalysts is that of afterburning, which is descriptive of further burning of CO to $CO_2$ in a dilute phase. It is advisable to avoid afterburning as it leads to a significant increase in temperatures in regenerator flue gas vent system, which in-turn damages the equipment and further permanently destroys the catalyst activity.

In the recent years, environment regulations have become very stringent on the emission of CO into the atmosphere, which has necessitated the changes in the functioning of FCC units, irrespective of the costs of petroleum refining. Hence there is an ultimate need to develop a catalyst or a process which can reduce or eliminate afterburning as well as control emission of CO into the atmosphere.

U.S. Pat. Nos. 2,382,382, 2,647,860, 3,696,025 discloses methods to increase the regeneration temperature to 690 to 760° C. in the presence of high concentration of $O_2$ in the regenerator, so as to enable complete combustion of coke to $CO_2$ in the regeneration level. However, metallurgical limitations do not permit the adoption of such a method with existing plants. Though, such a process helps in preventing afterburning, it does not provide a control in the $CO_2/CO$ ratio to the desired level in accordance to the present time.

U.S. Pat. Nos. 3,864,461 and 4,332,782 discloses a procedure for the production of a crystalline alumina of low bulk density.

U.S. Pat. No. 4,093,535 discloses impregnation of noble metals such as Pt and Pd in Y type zeolite, which is an active component of the FCC catalyst. Such catalysts with 25 ppm Pt and 25 ppm Pd significantly control $CO_2/CO$ ratio. However these catalysts do not avoid the required flexibility such as, (1) addition of CO-combustion promoter cannot be terminated as and when required, (2) in order to increase the $CO_2/CO$ ratio.

U.S. Pat. No. 4,199,435 discloses a combustion promoter selected from the metals, such as Pt, Pd, Ir, Os, Ru, Rh. Re, and copper on an inorganic support.

U.S. Pat. Nos. 4,290,878 and 4,300,997 describes a Pt—Ir and Pt—Rh bimetallic promoter, Pd—Ru promoter that reduces NOx compared to conventional Pt promoter.

U.S. Pat. No. 5,565,399 relates to a CO promoter for use in a FCC unit. The promoter is composed of catalytic platinum particles dispersed over alumina support particles and stabilized physically and chemically with a mixture of rare earth for higher catalytic activity, longer catalyst durability, and better unit retention of the catalyst in a cracking unit.

It is known that the peptization is one of the essential properties in alumina, which imparts binding properties to a catalyst during shaping of the catalyst. In general, 5-50% of binder grade alumina mixed along with other matrix/active components during catalyst preparation due the slurry handling issues of peptized binder grade alumina. In order to obtain proper binding nature and good attrition strength, large amount of aluminium chloro hydrol/aluminium hydroxyl nitrate is added to peptizable pseudoboehmite alumina.

U.S. Pat. No. 4,542,118B1 and EP0742044A1 disclose the preparation of an organic composition from slurry of alumina and aluminium chlorhydrol. Other prior art documents, U.S. Pat. Nos. 4,476,239 and 4,443,553 and CA967136 discloses processes, wherein addition of a small amount of aluminium hydroxy chloride or hydroxy nitrate reduces the viscosity of the slurry containing zeolite and other components.

These prior-art documents U.S. Pat. Nos. 4,542,118, 4,476,239, and 4,443,553, EP0742044A1, and CA967136 further provide evidence that the flocculating property of alumina is being arrested by the application of aluminium chloro hydrol, aluminum hydroxyl nitrate in a significant quantity. It may be noted that aluminum chloro hydrol contains 17% of chlorine and application of which corrodes the hardware being used for shaping of the catalyst microspheres. Moreover, the chlorine and nitrate gases emanated while processing such dispersant laded products i.e. the catalyst is harmful to atmosphere and is well known for its adverse effects on human health. Therefore, it is essential to use such dispersants in smaller proportion.

It is clear from the aforementioned discussion that with growing regulations on CO emission in the environment and for circumventing the problem of afterburning associated with the FCC technology, improved methods are continuously sought which besides being environmental friendly also provides efficient oxidation of CO. Hence, in order to achieve enhanced CO-combustion efficiency, it is proposed to use small amount of dispersants along with a easily dispersible small crystallite alumina as a binder to bind large crystallite and large pore diameter alumina derived from oxides, hydrates and oxy-hydrates.

SUMMARY OF THE INVENTION

The main objective of the present invention is to provide a composition and a process of preparation of CO oxidation promoter catalyst having improved average pore diameter, ABD and attrition properties and steam stability for use in hydrocarbon conversion.

Another objective of the present invention, in particular, relates to the composition CO oxidation promoter catalyst which possesses large crystallite, low surface area alumina in the range 35 to 95 wt % bonded by 2-45 wt % composite binder prepared by reacting 1-35 wt % of nano-crystallite alumina with 0.1 to 10 wt % dispersant, and 100-1000 ppm platinum or palladium or both.

Still another objective of the present invention is to provide a process for the preparation of CO oxidation promoter catalyst.

DESCRIPTION OF THE INVENTION

While the invention is susceptible to various modifications and/or alternative processes and/or compositions, specific embodiment thereof has been shown by way of example in tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is NOT intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

According to the main embodiment, the present invention provides a composition and a process of preparation of CO oxidation promoter catalyst having improved average pore diameter, ABD and attrition properties and steam stability for use in hydrocarbon conversion.

In a preferred embodiment of the present invention provides a particulate CO oxidation promoter catalyst composition comprising:
  (a) large crystallite low surface area alumina;
  (b) composite binder comprising nano-crystallite alumina and dispersant; and
  (c) platinum or palladium or both;
  wherein, the large crystallite low surface area alumina is bound together by the composite binder in the said particulate composition.

In another preferred embodiment, the present invention also provides a process for preparation of the particulate CO oxidation promoter catalyst composition, the process comprising:

a. reacting a nano-crystallite alumina with a dispersant to obtain a composite binder;
  b. milling and homogenizing large crystallite low surface area alumina with the composite binder to obtain a precursor slurry;
  c. spray drying the precursor slurry to obtain particulate green catalyst;
  d. calcining the green catalyst to obtain calcined alumina support; and
  e. impregnating the calcined alumina support with at least one of platinum or palladium to obtain the particulate catalyst composition.

In yet another preferred embodiment of the present invention, the CO oxidation promoter catalyst composition comprises of the large crystallite, low surface area alumina in the range of 35 to 95 wt % bonded by the composite binder in the range of 2-45 wt %. The composite binder is prepared by reacting nano-crystallite alumina in the range of –35 wt % with the dispersant in the range of 0.1 to 10 wt %, and 100-1000 ppm platinum or palladium or both.

In a preferred aspect of the present invention, shape of the particulate catalyst composition is, but not limited to, a microsphere.

In another preferred feature of the present invention, the CO oxidation promoter catalyst composition possesses following parameters, but not limited to the range provided herewith:
  Average pore diameter between, but not limited to, 60 Å to 600 Å;
  Surface area of product is in the range of 40-160 $m^2/g$;
  ABD is in the range 0.75 to 1.00 g/cc and ASTM D5757 attrition index below 10;
  Nano-crystallite alumina has crystallite size in the range 2-5 nanometer, surface area 150-430 $m^2/g$ and of pseudo-boehmite phase;
  Large crystallite alumina has crystallite size in the range 4.5-40 nanometer, surface area 20-150 $m^2/g$.

In yet another preferred feature of the present invention, the composition comprises large crystallite alumina selected from the group comprising of bayerite, boehmite, pseudo-boehmite, gamma, alpha, delta and theta.

In a feature of the present invention, the composition comprises dispersant for nano-crystallite alumina selected from a group consisting of aluminum hydroxyl chloride and aluminum hydroxynitrate.

In one aspect of the present invention, the nano-crystallite alumina is selected from group consisting of pseudoboehmite and boehimite.

In another preferred aspect of the present invention, the CO oxidation promoter catalyst composition is efficient such that only 0.05 wt % concentration of the composition, in spent catalyst having residual coke in the range 0.1-3 wt %, is capable of converting carbon monoxide to carbon dioxide. The efficiency of the composition for conversion of CO to $CO_2$ in the spent catalyst is in the range of 90-97% at a temperature range of 490 to 800° C.

EXAMPLES

The present invention is exemplified by following non-limiting examples:

Example 1

Preparation of Pseudo Boehmite Alumina and a Catalyst as Per Example 3 Cited in EP0742044 A1:

For this preparation alumina, sodium aluminate solution was reacted with aluminum sulphate solution at 90 to 95° C.

The final crystallized and washed product alumina having residual soda less than 0.2%, crystallinity more than 92%, surface area of 260 m²/g and pore diameter in range 40-150 Å was considered for binder.

Example 2

Preparation of CO oxidation promoter employing alumina of Example 1 above and dispersant prepared as per Example 1 of EP0742044A1 with platinum content 500 ppm. Both fresh and steam deactivated CO combustion promoters were evaluated for performance. The physico-chemical properties of the final catalyst along with the performance are shown below. The performance evaluation of catalyst was carried out in fluidized catalyst evaluation MAT unit of ACE make. For this, 0.05 g of CO-promoter was thoroughly mixed with 9.95 g of spent catalyst containing 0.85% coke. After loading the catalyst in a reactor, the same was heated to 685° C., in inert nitrogen atmosphere. When the temperature of the reactor stabilized, nitrogen flow is discontinued and replaced by air at a rate of 18 to 20 ml per minute. The flue gas generated thereby was collected during the initial 20 minutes homogenized and its composition is determined by gas chromatography. Similarly 750° C., 3 hrs steam deactivated catalyst was also evaluated for performance.

| Catalyst | ABD (g·cm⁻³) | % Attrition | Surface area (g·m⁻²) | Pt (ppm) | $CO_2$ % | CO % | $CO_2$/CO | Conv % |
|---|---|---|---|---|---|---|---|---|
| Fresh CO promoter catalyst | 0.95 | 2.8 | 251 | 502 | 97.45 | 2.55 | 38.22 | 97.39 |
| Steam deactivated CO promoter | 0.95 | 3.2 | 148 | 502 | 91.99 | 8.01 | 11.48 | 91.30 |

Example 3

Preparation and Performance Evaluation of CO Combustion Promoter as Per US Pat Appln No 20150352525 A1

Alumina microspheres were produced employing nano-crystalline alumina prepared as per example 1 of US Pat Appln. No 20150352525 A1 were shaped to microspheres by spray dryer. The performance evaluation was carried out as per procedure illustrated in example 2 above. The properties and performance of the promoter is given below:

| Catalyst | ABD (g·cm⁻³) | % Attrition | Surface area (g·m⁻²) | Pt (ppm) | $CO_2$ % | CO % | $CO_2$/CO | Conv % |
|---|---|---|---|---|---|---|---|---|
| Fresh CO promoter catalyst | 0.92 | 2.7 | 268 | 501 | 96.02 | 3.98 | 24.13 | 95.85 |
| Steam deactivated CO promoter | 0.92 | 4.1 | 160 | 500 | 90.71 | 9.29 | 9.76 | 89.77 |

Example 4

Preparation of COP, Employing Low Surface Area Pseudo Boehmite Alumina, Nano-Crystallite Based Binder 600 g of nano-crystalline alumina wet cake with crystallite size 3 nm, solid content 11% was dispersed in 500 g water and kept under stirring. 156 g of Pural 400 grade alumina of (originally sourced from Condea Chemie) with crystallite size 7 nm, particle size (d50) of 40 micron, and surface area 34 m²/g was ground in a ball mill to size below 5 micron and slurried in nano-crystallite alumina. Finally, precursor slurry with solid content 20-22% was spray dried to produce green catalyst support microsphere. The spray dried product was calcined at 650° C. for 2 hrs, cooled to room temperature and impregnated with 500 ppm of platinum and dried to produce the catalyst product. The performance evaluation was carried out as per procedure illustrated in example 2 above. The properties and performance of the catalyst promoter is given below:

| Catalyst | ABD (g·cm⁻³) | % Attrition | Surface area (g·m⁻²) | Pt (ppm) | $CO_2$ % | CO % | $CO_2$/CO | Conv % |
|---|---|---|---|---|---|---|---|---|
| Fresh CO promoter catalyst | 0.89 | 12.45 | 125 | 500 | 94.56 | 5.44 | 17.38 | 94.25 |
| Steam deactivated CO promoter | 0.9 | 13.51 | 105 | 500 | 89.44 | 10.56 | 8.47 | 88.19 |

Example 5

Preparation of COP, Employing Low Surface Area Pseudo Boehmite Alumina, Nano-Crystallite Reacted Binder 600 g of nano-crystalline alumina wet cake with crystallite size 3 nm, solid content 11% was dispersed in 500 g water and kept under stirring. To this alumina was added, 100 g of aluminum hydroxynitrate containing 15 wt % of alumina on oxide basis. The mixture was heated to 40-50° C. for 1 hour to produce a translucent, viscous binder of present invention. 156 g of Pural 400 grade alumina of (originally sourced from Condea Chemie) with crystallite size 7 nm, particle size (d50) of 40 micron, and surface area 34 m²/g was ground in a ball mill to size below 5 micron employing water as solvent and mixed in binder prepared above and vigorously stirred to produce catalyst precursor slurry. Slurry of solid content 22% was spray dried to produce green catalyst support microsphere. Further processing and performance evaluation was carried out as per procedure of example 2. The properties and performance of the catalyst promoter is given below:

| Catalyst | ABD (g·cm⁻³) | % Attrition | Surface area (g·m⁻²) | Pt (ppm) | $CO_2$ % | CO % | $CO_2$/CO | Conv % |
|---|---|---|---|---|---|---|---|---|
| Fresh CO promoter catalyst | 0.96 | 2.21 | 121 | 505 | 95.51 | 4.49 | 21.27 | 95.30 |
| Steam deactivated CO promoter | 0.95 | 2.82 | 109 | 504 | 95.77 | 4.23 | 22.64 | 95.23 |

Those of ordinary skill in the art will appreciate upon reading this specification, including the examples contained herein, that modifications and alterations to the composition and the process of making the composition may be made within the scope of the invention and it is intended that the scope of the invention disclosed herein be limited only by the broadest interpretation of the appended claims to which the inventor is legally entitled.

The invention claimed is:

1. A process for preparation of a particulate CO oxidation promoter catalyst composition, the process comprising:
   (a) reacting a nano-crystallite alumina with a dispersant to obtain a composite binder;
   (b) milling and homogenizing a large crystallite low surface area alumina with the composite binder to obtain a precursor slurry, wherein the large crystallite low surface area alumina has a crystallite size in a range of 4.5 to 40 nm and a surface area in a range of 20 to 150 $m^2/g$;
   (c) spray drying the precursor slurry to obtain a particulate green catalyst;
   (d) calcining the green catalyst to obtain a calcined alumina support; and
   (e) impregnating the calcined alumina support with at least one of platinum or palladium to obtain the particulate CO oxidation promoter catalyst composition.

2. The process as claimed in claim 1, wherein the dispersant is selected from a group consisting of at least one of aluminum hydroxyl chloride and aluminum hydroxynitrate.

3. The process as claimed in claim 1, wherein the composite binder comprises of the nano-crystallite alumina in a range of 1 to 35 wt % and the dispersant in a range of 0.1 to 10 wt %.

4. The process as claimed in claim 1, wherein the nano-crystallite alumina has a crystallite crystallize size in a range of 2 to 5 nm and a surface area in a range of 150-430 $m^2/g$.

5. The process as claimed in claim 1, wherein the nano-crystallite alumina has a pseudo-boehmite phase.

6. The process as claimed in claim 1, wherein the particulate CO oxidation promoter catalyst composition has a shape of a microsphere.

7. A particulate CO oxidation promoter catalyst composition, prepared according to the process as claimed in claim 1, the composition comprising:
   (a) a large crystallite low surface area alumina, wherein the large crystallite low surface area alumina has a crystallite size in a range of 4.5 to 40 nanometer and a surface area in a range of 20 to 150 $m^2/g$;
   (b) a composite binder comprising nano-crystallite alumina and a dispersant; and
   (c) platinum, palladium, or both;
   wherein, the large crystallite low surface area alumina is bound together by the composite binder in the particulate CO oxidation promoter catalyst composition.

8. The composition as claimed in claim 7, wherein the particulate CO oxidation promoter catalyst composition has an average pore diameter in a range of 60 Å to 600 Å, a surface area in a range of 40 to 160 $m^2/g$, ABD (apparent bulk density) in a range of 0.75 to 1.00 g/cc, and ASTM D5757 attrition index below 10.

9. The composition as claimed in claim 7, wherein the nano-crystallite alumina has a crystallite size in a range of 2 to 5 nanometer and a surface area in a range of 150 to 430 $m^2/g$.

10. The composition as claimed in claim 7, wherein the composition comprises:
    (a) 35 to 95 wt. % of the large crystallite low surface area alumina;
    (b) 2 to 45 wt % of the composite binder comprising 1 to 35 wt % nano-crystallite alumina and 0.1 to 10 wt % dispersant; and
    (c) 100 to 1000 ppm of platinum, palladium, or both.

11. The composition as claimed in claim 7, wherein the large crystallite low surface area alumina is selected from a group consisting of bayerite, boehmite, pseudoboehmite, gamma, alpha, delta, and theta.

12. The composition as claimed in claim 7, wherein the nano-crystallite alumina is selected from a group consisting of pseudo-boehmite and boehimite.

* * * * *